United States Patent [19]

Reyes

[11] 4,445,702

[45] May 1, 1984

[54] SUPER BIKE

[76] Inventor: Daniel Reyes, 233 Broadway, Room 3615, New York, N.Y. 10007

[21] Appl. No.: 324,049

[22] Filed: Nov. 23, 1981

[51] Int. Cl.³ .............................................. B62K 5/02
[52] U.S. Cl. .................................... 280/239; 280/283
[58] Field of Search ............... 280/219, 239, 283, 286, 280/43, 43.18; 180/209

[56] References Cited

U.S. PATENT DOCUMENTS 635,896 10/1899 Miller .................................. 280/239
4,118,045 10/1978 Kanazawa ........................... 280/283

FOREIGN PATENT DOCUMENTS 543424 9/1922 France ................................ 280/283
9630 of 1887 United Kingdom ................ 280/283

Primary Examiner—Joseph F. Peters, Jr.
Assistant Examiner—D. Lynn Fugate

[57] ABSTRACT

An improved super bike, including a bicycle with a third wheel located between the bicycle front and rear wheels and means for the third wheel to selectively engage the ground, the third wheel carrying the foot pedals for powering the vehicle travel.

1 Claim, 3 Drawing Figures

SUPER BIKE

This invention relates generally to cylces upon which a cyclist can ride. A principal object of the present invention is to provide a new type of bicycle which includes a third wheel located between the front and rear wheels, and wherein the third wheel is selectively engagable with the ground surface so to selectively raise either the front or rear wheel, by selectively counterbalancing a persons weight forwardly or rearwardly of the third wheel and thus produce a novel ride wherein steering is accomplished only at such moments when the front wheel engages the ground.

Yet another object is to provide a bicycle in which the third wheel is supported by springs in a raised position and can be urged by the feet so to engage a ground.

Figure 1:
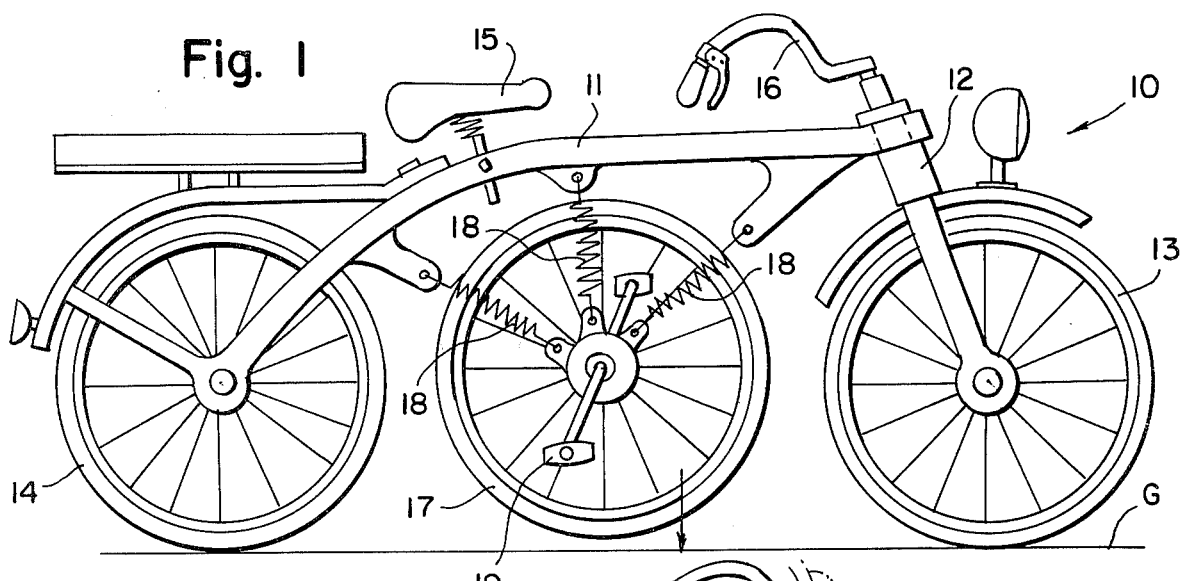
FIG. 1 is a side elevation view of another design of the invention which includes a midwheel for powering the super bike.

Referring now to the drawing in greater detail, and more particularly to FIG. 1 thereof, at this time, the reference numeral 10 represents a bicycle according to the present invention, wherein there is a bicycle frame 11 which at its front is supported upon a pivotable fork 12 supported upon a front wheel 13, while a rear of the frame is supported upon a rear wheel 14. The frame carries a seat 15 for a rider to sit thereupon while grasping a handlebar 16 affixed to the upper end of the fork, in order to steer the bicycle.

In the present invention, a third wheel 17, located between the front and rear rear wheels, is suspended from the frame by means of radially extending tension cord springs 18.

Normally the third wheel is carried so that it does not contact the ground G, however it can be forced downward so to engage the ground G2 by means of the riders feet bearing downward against crank pedals 19 and to rotate the wheel during moments while ground engaged, and thus power the vehicle for travel. As shown, the springs support a bearing block in which the wheel axle is rotatable.

Figure 2:
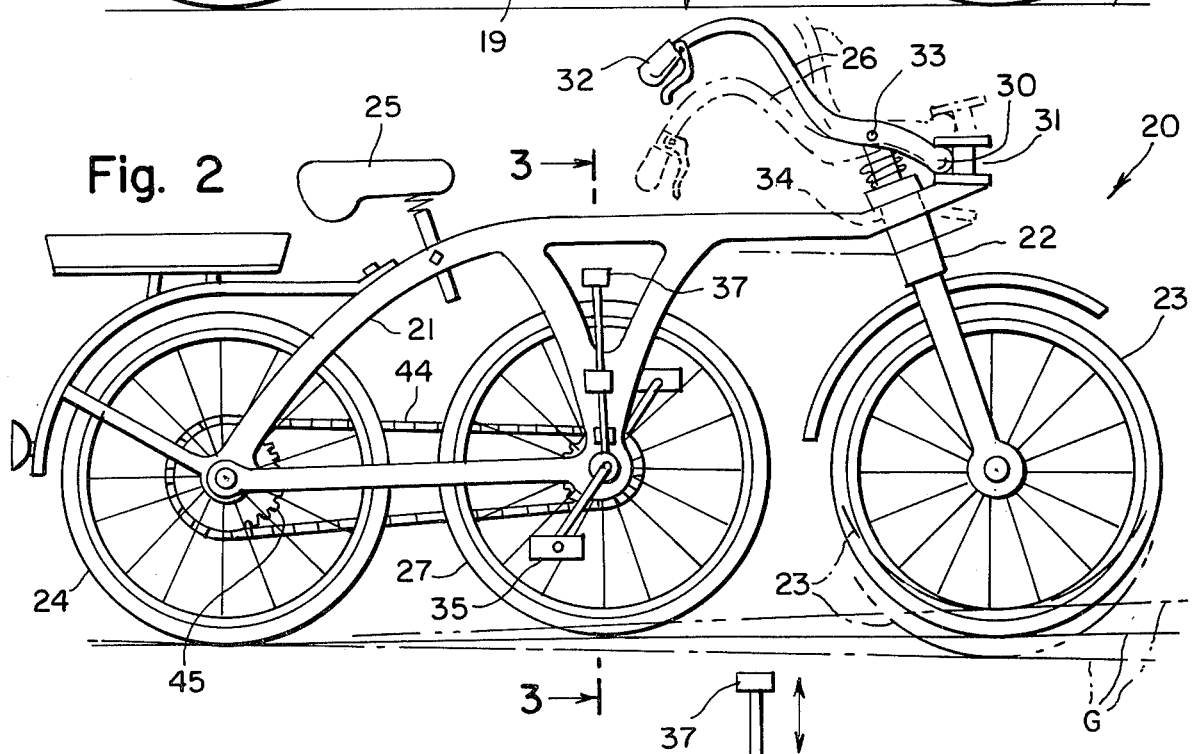
FIG. 2 is a similar view of a further modified design of the midwheel wherein the foot pedals power either of the midwheel or the rear wheel, as wished by means of a cluch and the handlebars activate the wheel up and down.
Figure 3:
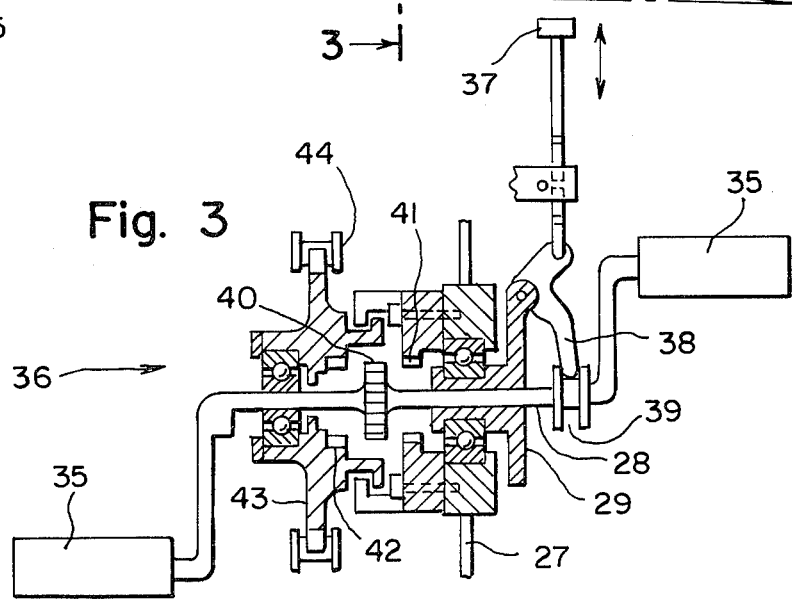
FIG. 3 is a transverse cross sectional view of the midwheel hub mechanism shown in FIG. 2.

Referring now to FIGS. 2 and 3, the bicycle 20 includes a frame 21, a fork 22 on which the frame is pivoted, a front wheel 23, a rear wheel 24, and seat 25 as above described. However in this design, the handlebar 26 for steering the bicycle are additionally vertically pivotable so to raise or lower the fork and front wheel respective to ground G and cause a third wheel 27, to selectively contact the ground G or be raised therefrom. In this design, the third wheel includes a crank pedal axle 28 journalled in a bearing block 29 which is a rigid component of the frame 21. The handlebar pivots about a knuckel 30 formed on the handlebar and which is pivotable in an annular groove 31 formed on a forward end of the frame. Thus when the handgrip 32 of the handlebar is pulled upward from the position shown in dot dash lines to the position shown in solid lines, in FIG. 2, the fork and front wheel is thus raised so to cause the third wheel to contact the ground G, a longitudinally intermediate portion of the handlebar is connected by a pivot pin 33 to the fork so as to cause this adjustment. The fork is slidable in a hole 34 of the frame.

When the third wheel contacts the ground, the rider can push the pedal 35, on wheel 27, with his feet, so to power the vehicle for travel across a ground.

The mechanism 36 shown in FIG. 3 permits the rider to power either the third wheel or the rear wheel, as he wishes. This is accomplished by a manually operated clutch handle 37, which when pulled up, cause a lever 38 riding in an annular groove 39 of the axle, to slide the axle and a gear 40 affixed on the shaft, engages a gear 41 so that the foot pedals drive the third wheel 27. If the clutch handle is pushed, then the gear 40 engages a gear 42 of a sprocket 43 engaged by endless chain 44 around a sprocket 45 of the rear wheel.

If the handlebar 26 is raised still farther so that the third wheel is thus still lower than either the front and rear wheels, whereby the vehicle can be rocked forwardly or rearwardly about the third wheel, simply by the rider shifting his body weight forwardly or rearwardly above the third wheel. Thus when rocking forwardly, the front wheel engages the ground so to steer the vehicle. When rocked rearwardly, then only the rear wheel with the third wheel engages the ground, and either of which can be powered, as wished.

While various changes may be made in the detail construction, it is understood that such changes will be within the spirit and scope of the present invention as is defined by the appended claims.

What is claimed is:

1. An improved super bike, comprising in combination, a bicycle having a frame, a fork, a front wheel supporting said fork, a rear wheel supporting a rear end of said frame, a third wheel carried by said frame and located between said front and rear wheels in combination with means mounted on said frame supporting said third wheel spaced from the ground, in further combination with pedals on said third wheel, a rider's seat on said frame, and a handle bar on said fork whereby the rider's weight on said third wheel pedals causes ground engagement.

* * * * *